Nov. 17, 1964  L. Z. HALL  3,157,424
STORAGE RACK
Filed Dec. 10, 1962  6 Sheets-Sheet 1
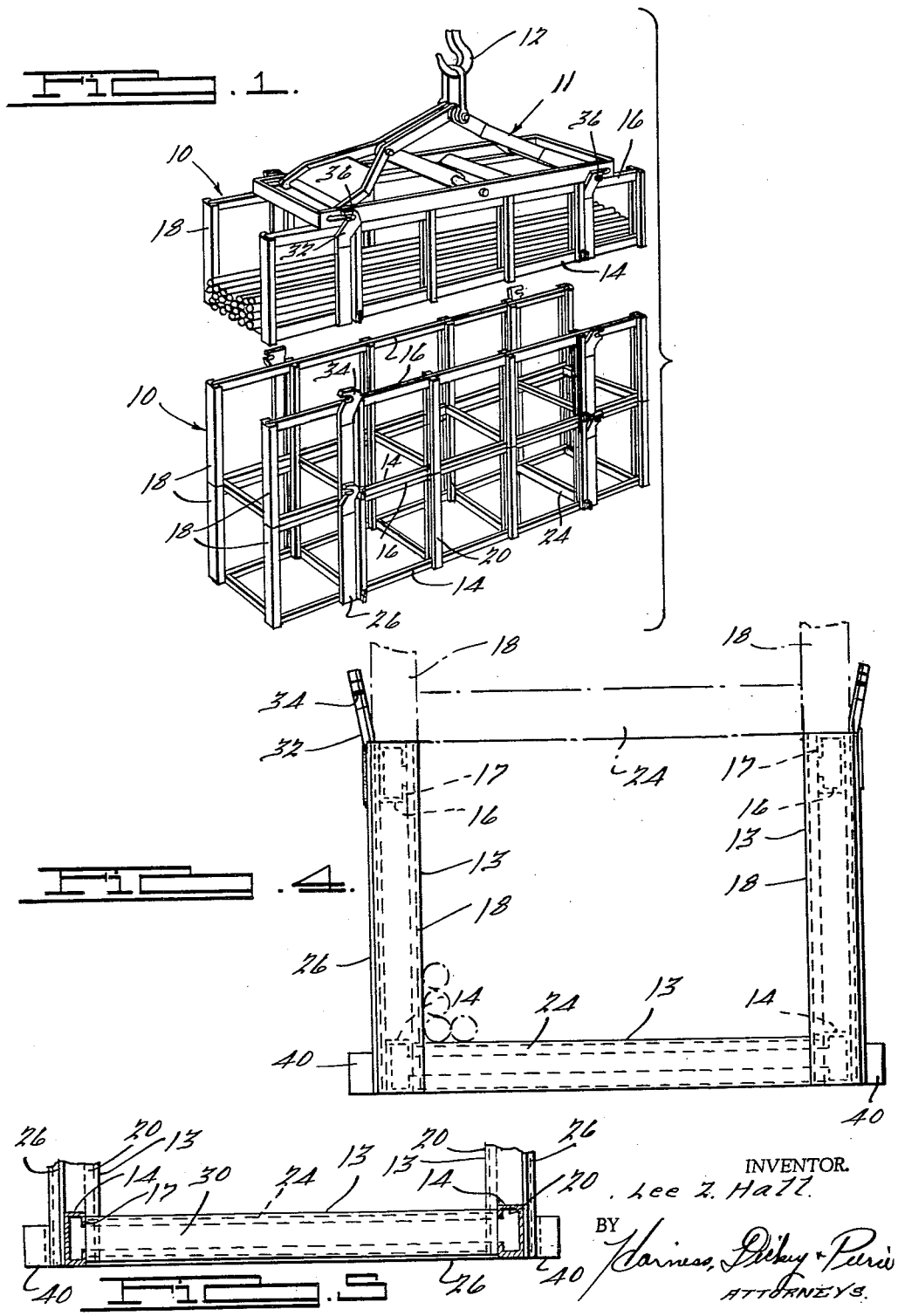
INVENTOR.
Lee Z. Hall
BY
ATTORNEYS

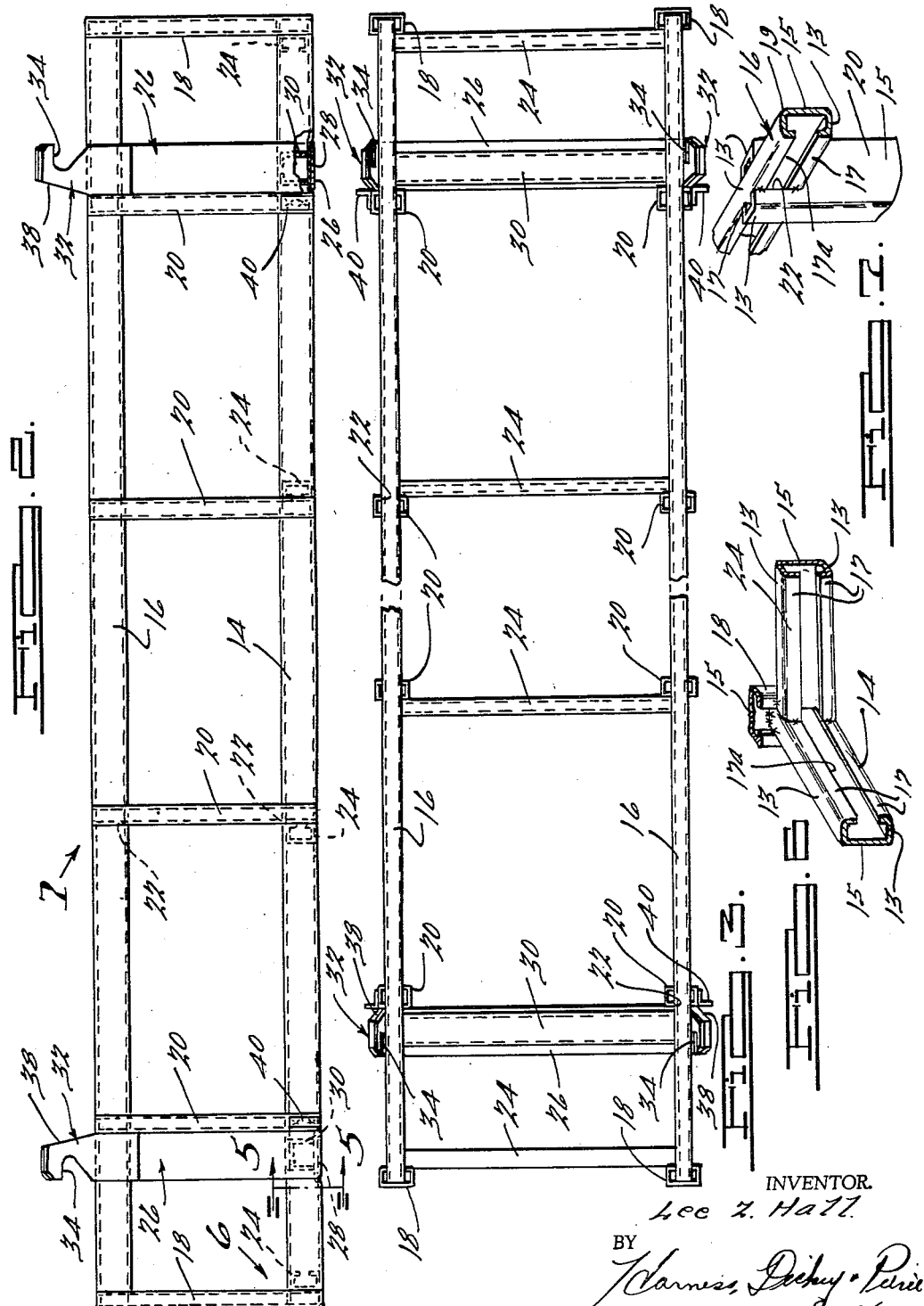

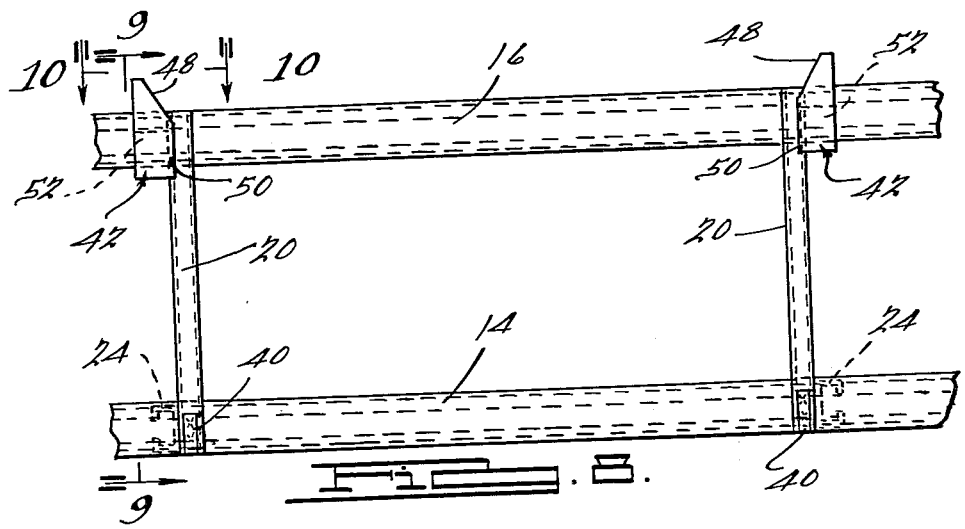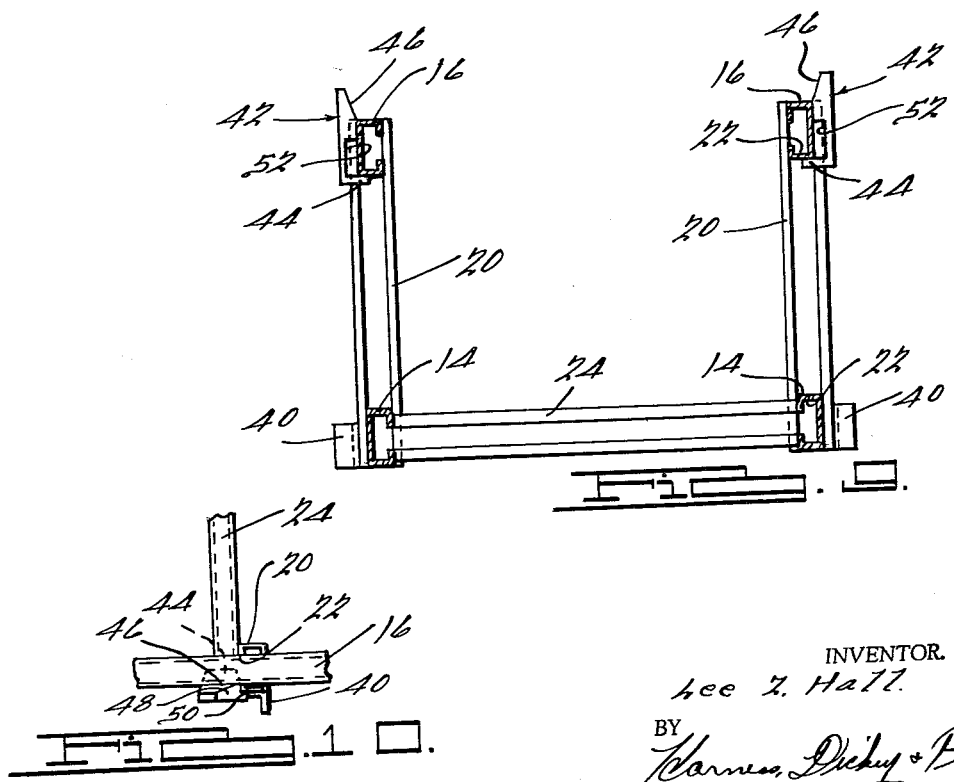

Nov. 17, 1964      L. Z. HALL      3,157,424
STORAGE RACK

Filed Dec. 10, 1962      6 Sheets-Sheet 4

INVENTOR.
Lee Z. Hall
BY
Harness, Dickey & Pierce.
ATTORNEYS

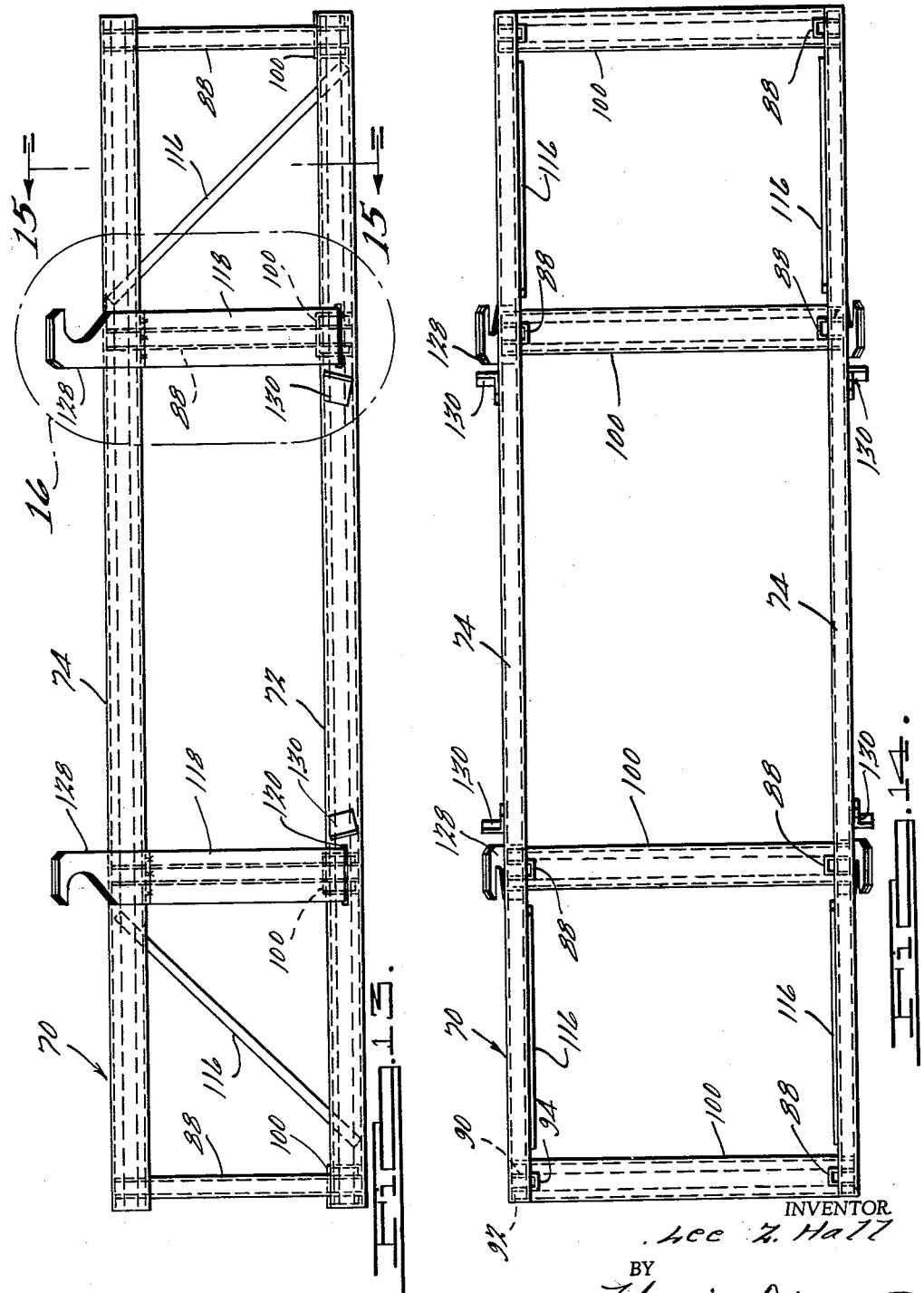

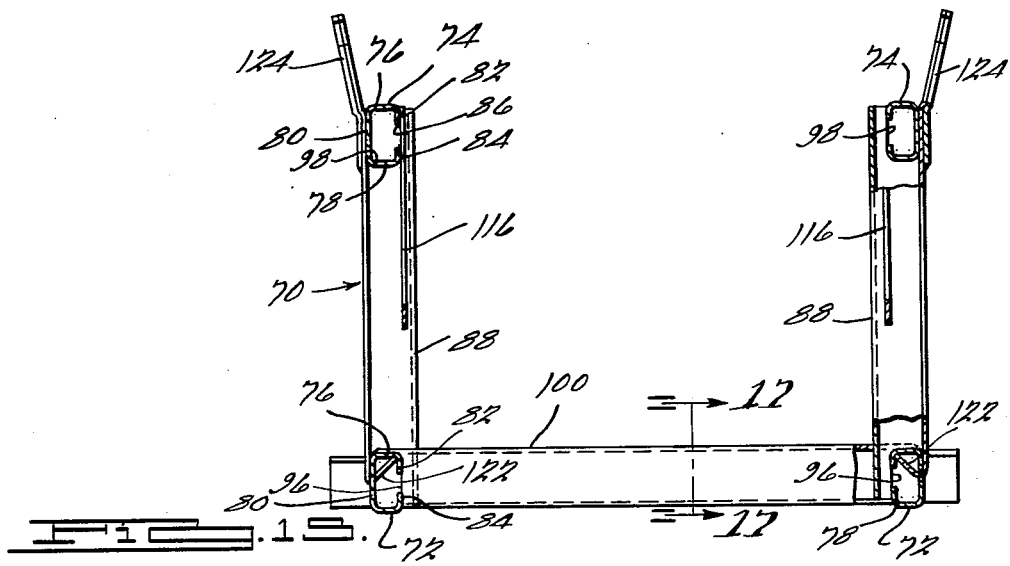

United States Patent Office 3,157,424
Patented Nov. 17, 1964

3,157,424
STORAGE RACK
Lee Z. Hall, Huntington Woods, Mich., assignor to Palmer-Shile Company, Detroit, Mich., a corporation of Michigan
Filed Dec. 10, 1962, Ser. No. 243,541
14 Claims. (Cl. 294—67)

The present invention broadly pertains to storage racks and more particularly to an improved high strength, light weight portable rack for storing and transporting raw materials in elongated form such as rods, bars, channels, pipes, and the like, and which rack can be conveniently stacked in tiered relationship providing thereby a substantial savings in plant space.

This application is a continuation-in-part of the applicant's copending application, Serial No. 183,920, filed March 30, 1962, now abandoned.

Storage racks of the general type to which the present invention is applicable are in widespread use in industry for facilitating the storage, material handling, and inventory control of various types of elongated stock. The racks are conventionally known as bar racks and are adapted to be stacked in a series of tiers disposed in adjacent rows and selected ones thereof can be simply removed by suitable hoist equipment and transported by overhead conveyor means or by work trucks to a desired work area.

Bar racks of the type heretofore known have been deficient in one or more aspects, depending upon the handling and storage conditions and the nature of the material handled thereby. For example, prior bar racks which are formed of an elongated, open top framework defining a generally U-shaped storage area have heretofore necessitated the use of a relatively heavy structural framework to minimize distortion thereof as imposed by the load contained therein resulting in a relatively heavy weight thereby detracting from the total payload of stock which conveniently can be stored and transported therein as well as necessitating the use of higher capacity cranes, hoists or other handling equipment.

In addition, the outward forces imposed by the load against the side members of prior bar racks have caused a spreading tendency which increases the difficulty of stacking a plurality of bar racks in tiered relationship and in some instances has resulted in a buckling of a stacked tier resulting in a dumping of a load. The difficulty of stacking the bar racks of the types heretofore known has been further aggravated by their columnar construction whereby it has been necessary to precisely align adjacent racks of a tier so that the columns of one are disposed in substantially precise end bearing relationship with the columns of the adjacent rack disposed therebelow to which the entire load of the bar rack and stock therein is transmitted.

Another disadvantage of bar racks of the types heretofore known has been the presence of relatively sharp projections, weld lines and edges along the inner surfaces thereof against which the bar stock is disposed which frequently results in a scratching or marring of the surfaces of the stock as occasioned by contact with such projections, weld lines and edges. This condition is particularly undesirable when stock of a relatively soft nature such as soft metal alloys, plastics, and wood, for example, are stored therein.

Prior bar racks have also been subject to the disadvantage that in many instances slings could not be utilized within the confines of the rack for the purpose of placing material in or removing it from the rack.

It is accordingly a primary object of the present invention to provide an improved bar rack construction which overcomes the problems and disadvantages associated with bar racks of the types heretofore known.

Another object of the present invention is to provide an improved bar rack construction which is of high strength and light weight enabling increased payloads to be carried thereby or equal payloads to be conveniently handled by hoist and transfer equipment having a lower lifting capacity than required with prior bar racks.

Another object of the present invention is to provide an improved bar rack construction which facilitates the stacking of the bar racks in tiered relationship and in which tiered relationship the weight of the overlying bar rack is transmitted substantially along its entire length to the bar rack disposed therebelow.

A further object of the present invention is to provide an improved bar rack construction wherein the interior of the elongated framework is devoid of any sharp projections, weld lines or edges therealong which could cause damage to the surfaces of bar stock stored therein during the handling and transportation thereof as well as during loading and unloading.

A further object of the present invention is to provide an improved bar rack construction employing structural members of a preselected cross sectional configuration which are positioned so as to accomplish optimum rigidity and resistance to bending, the interfitting of the interconnected members providing a light weight, unitary framework which resists deformation or skewing thereof in spite of heavy loading forces applied thereto.

Another object of the present invention is to provide an improved bar rack construction incorporating improved engaging means thereon for engaging and lifting and lowering the bar rack facilitating its transportation to selected work areas and stacking the bar racks in tiered relationship.

A further object of the present invention is to provide an improved bar rack which because of its light weight substantially reduces the freight charges in shipping the rack from one location to another.

Another object of the invention is to provide an improved bar rack construction which enables the use of slings within the confines of the rack for the purpose of placing material in or removing it from the rack.

Still another object of the present invention is to provide an improved bar rack which is of strong light weight construction, and economical to manufacture.

Other objects, features, and advantages of the present invention will become apparent from the subsequent description, the appended claims, and the accompanying drawings, in which:

FIGURE 1 is a perspective view of a plurality of stacked bar racks constructed in accordance with one embodiment of the present invention and illustrating an engaging mechanism for engaging and lifting a bar rack to and from a stacked or tiered relationship;

FIG. 2 is a side elevational view partly in section of a bar rack of the type shown in FIGURE 1;

FIG. 3 is a fragmentary plan view of the bar rack shown in FIG. 2;

FIG. 4 is an end elevational view of the bar rack shown in FIG. 2 and illustrating the stacking relationship of a bar rack fragmentarily shown in phantom thereabove;

FIG. 5 is a fragmentary transverse sectional view through the lower longitudinal members of the bar rack shown in FIG. 2 and taken substantially along the line 5—5 thereof;

FIG. 6 is a fragmentary perspective view of a lower end corner of the bar rack shown in FIG. 2 as viewed along the arrow indicated at 6;

FIG. 7 is a fragmentary perspective view of the interfitting relationship of an intermediate member and the upper longitudinal member of the bar rack shown in FIG. 2 as viewed along the arrow indicated at 7;

FIG. 8 is a fragmentary side elevational view of another embodiment of the invention illustrating in particular an alternate form of an engaging means thereon for engaging and lifting the bar rack;

FIG. 9 is a transverse sectional view of the bar rack shown in FIG. 8 and taken substantially along the line 9—9 thereof;

FIG. 10 is a fragmentary plan view of one side of the bar rack shown in FIG. 8 as viewed along the direction of the arrows 10—10;

FIG. 13 is a side elevational view of another embodiment of the invention;

FIG. 14 is a top plan view of the structure illustrated in FIG. 13;

FIG. 15 is a transverse sectional view of the structure illustrated in FIG. 13 taken on the line 15—15 thereof;

FIG. 16 is an enlarged, fragmentary, side elevational view of the structure shown in the encircled portion of FIG. 13 indicated by the arrow 16;

FIG. 17 is a fragmentary sectional view of the structure shown in FIG. 15, taken on the line 17—17 thereof; and FIG. 18 is a fragmentary sectional view of the structure illustrated in FIG. 17, taken on the line 18—18 thereof.

Figure 11:
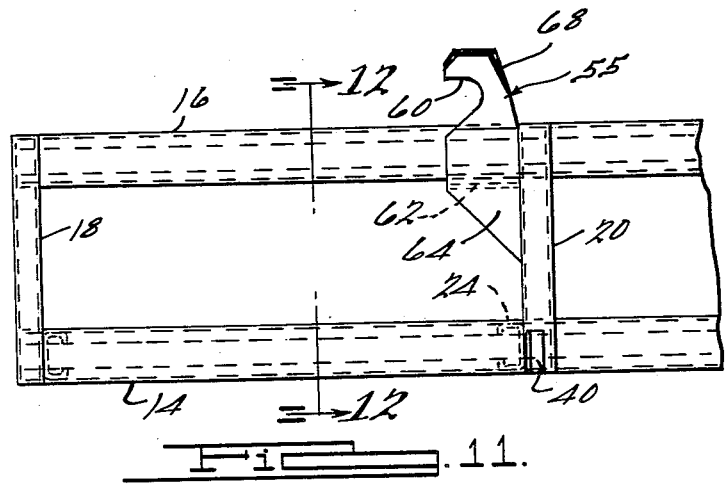
FIG. 11 is a fragmentary side elevational view of another embodiment of the invention illustrating another alternate form of engaging means for engaging and lifting the bar rack.

Referring now in detail to the drawings and more particularly to FIGURE 1, a series of bar racks 10 are illustrated positioned in a stacked or tiered relationship and from which relationship selected racks can be removed and transported, for example, by a suitable overhead hoist to selected work areas wherein the stock contained in the rack is readily accessible to the specific manufacturing operation. It will be understood that the bar racks may be of any desired length to accommodate any desired length of stock to be stored and transported therein, it being understood that it is desirable only to stack or tier racks of the same size and length. The upper bar rack as viewed in FIGURE 1 is illustrated in engaged relationship with an engaging mechanism or tong 11 which may suitably be suspended from a hook 12 connected to an overhead conveyor hoist actuatable to move the rack to the desired location.

In the embodiment of the present invention illustrated in FIGURES 1–7, each of the bar racks 10 is comprised of an elongated framework which is open at the top and at the ends thereof to facilitate loading and unloading of stock therefrom as well as providing for a slight overhang of stock having a length greater than the rack. Each bar rack 10 is comprised of a pair of upright side frames which are interconnected along the base thereof by a series of transverse members. Each side frame includes a lower longitudinal member 14 and an upper longitudinal member 16 which are disposed in vertically spaced, substantially parallel relationship and extend for substantially the entire length of the rack.

The longitudinal members 14 and 16, as well as the upright end members 18, the intermediate upright members 20, and the transverse members 24, are of a partially closed channel-shaped cross section as is best seen in FIGURES 6 and 7. Such structural members as shown in FIGURES 6 and 7 each include a first pair of flanges 13 disposed in spaced, substantially parallel relationship which are joined on one side by an integral web 15 extending therebetween, and a second pair of flanges 17 are provided which extend toward each other from the first pair of flanges 13 in spaced parallel relationship to the web 15, the ends of the flanges 17 terminating in spaced relationship so as to define an elongated slot 17a disposed centrally of the channel and having a width corresponding substantially to the width of the flanges 13 or minor outside dimension of each respective channel. The foregoing cross sectional configuration of the structural members provides for a unique interconnecting and interfitting relationship between the various members as will hereinafter be described in greater detail.

All of the structural members of the bar rack 10 and the rack 70 described hereinafter in greater detail may be of any high strength metal such as steel and are preferably cold formed to the cross sectional configurations shown in the drawings. It is also contemplated that alternate satisfactory structural metals such as aluminum alloy, for example, can be employed for providing extremely light weight bar racks which are of exceptionally high strength per unit weight and which may be satisfactorily employed in handling bar stocks of a lighter weight. In the preferred form of the configuration of the structural members, the corners thereof are preferably provided with a radius 19 as shown in FIGURE 7 forming thereby a smooth tangential intersection of the flanges 13 with the integral web 15 and the integral flanges 17.

The ends of the longitudinal members 14 and 16 are rigidly connected to each other by the upright end members 18 which extend between and are disposed in overlying relationship around the end portions of the longitudinal members. As shown in the drawings, the end portions of the longitudinal members 14, 16 extend through the slot 17a defined by the flanges 17 of the upright members 18 and are disposed with the ends thereof positioned in end-abutting relationship against the inner surface of the integral web of the upright members, the upper ends of the upright members 18 being substantially flush with the outer surface of the upper flange 13 on the member 16 and the lower ends of the upright members 18 being substantially flush with the outer surface of the lower flange 13 on the member 14. The end portions of the members 14 and 16 are welded to the adjacent surfaces of the web 15 and the flanges 17 to form a unitary structure.

The longitudinal members 14, 16 are also supported in spaced substantially parallel vertical relationship by a series of longitudinally spaced intermediate upright members 20 which are provided with an inwardly extending notch or slot 22 extending inwardly from the end portion of the integral web 15 thereof through which the longitudinal members 14 and 16 extend. The slot 22 is of a width corresponding substantially to the width of the slot 17a of the upright intermediate member 20 and extends inwardly from the end thereof a distance corresponding substantially to the major dimension of the longitudinal beams 14 and 16 so that the exterior surfaces of the longitudinal beams are substantially flush with the adjacent upper and lower end surfaces of the intermediate upright members 20. The number of intermediate members employed can be varied in acordance with the specific length of the bar rack to achieve the necessary bracing desired, and the adjacent surfaces of the members 20 and the members 14 and 16 are also welded to form a unitary structure.

Each of the side frames comprising the longitudinal members 14 and 16, the upright end members 18, and the upright intermediate members 20, are rigidly secured to each other in spaced substantially parallel relationship by a series of transverse members 24 which extend between and are disposed in end-abutting and welded relationship against the flanges 17 of the lower longitudinal beams 14 as may be best seen in FIGURES 5 and 6. The spacing of the transverse members 24 is such that the webs 15 thereof abut the flanges 17 of adjacent upright members 18 or 20 and are welded thereto thereby effecting a further interfitting relationship between the various structural components forming a more rigid and unitary framework.

It will be apparent from the foregoing that a relatively large edge-to-edge, surface-to-surface, and edge-to-surface contact between the interfitting members is achieved in accordance with the configuration of the structural members and the arrangement thereof in the generally U-shaped framework. This high degree of contact enables a greater length of total weld to be applied between adjoining members effecting a substantial improvement in the strength of the connections and the rigidity of the resultant framework. It will also be apparent that the major dimensions of the structural members are positioned in planar alignment with the direction of the maximum loading force to be applied thereto achieving thereby a maximum resistance to bending and skewing of the framework as occasioned by heavy loads contained therein and enabling thinner gauge metals to be employed while achieving greater ultimate strength of the rack.

The above-described construction also permits the use of slings within the confines of the rack for the purpose of placing stock in or removing it from the rack. When the stock is supported by the rack, as shown in FIGURE 4 for example, the stock bears against the inner flanges 13 of both the upright end members 18 and the intermediate upright members 20 and also bears against the flanges 13 of the transverse members 24 while the flanges 17 of the longitudinal members 14 and 16 are disposed outwardly of the flanges 13 of the upright members thereby providing clearance space substantially equal to the width of the flanges 17 of the upright members which permits the slings to be applied to and removed from the load when the slings are disposed within the confines of the rack intermediate the transverse members 24.

The engaging means embodied in the bar rack shown in FIGURES 1–7 comprises a generally U-shaped crane bar 26 which extends beneath the rack and upwardly along the side frames thereof. The lower longitudinal members 14 are provided with a recess or indentation 28 along the lower flange thereof as best seen in FIGURE 2 which has a depth and a width corresponding substantially to the thickness and the width of the crane bar 26 so that the lower surface of the crane bar 26 is flush with the adjacent lower surfaces of the member 14. The framework is further rigidified at a point corresponding to the underlying portion of the crane bar 26 by means of a transverse integral channel 30 which extends transversely between and has the ends thereof disposed in end-abutting relationship against the adjacent flanges 17 of the lower longitudinal beams 14. The channel 30 is securely welded to the longitudinal beams 14 at the ends thereof and the flanges of the channel 30 are welded to the upper surface of the crane bar 26 along each side thereof so as to form a box beam. The edges of the crane bar are also welded to the adjacent intermediate member 20 to further strengthen the unit.

The upper end portions of the crane bar 26 are preferably provided with an extra thickness which is welded to the crane bar in the area formed as a hook portion generally indicated at 32 and is provided at the edges thereof facing the ends of the bar rack with an engaging slot 34 in which the latching rods 36 of the lifting tong 11 as shown in FIGURE 1 are adapted to become engaged for lifting and transporting the bar rack.

The upper projecting portions of the crane bar 26 also serve a guiding function for facilitating the stacking of one bar rack on the other. As shown in FIGURE 4, the upper projecting portions or hook portion 32 of the crane bar 26 are angularly inclined outwardly forming upwardly and outwardly diverging inner surfaces which provide a camming action in coaction with the lower longitudinal member 14 of a second bar rack during the lowering thereof facilitating lateral alignment of one rack with respect to the other. The hook portions 32 also serve to maintain the tiered bar racks in appropriate lateral alignment and prevent relative edgewise slippage thereof during their storage in tiered relationship.

The upwardly projecting hook portions 32 also serve to facilitate appropriate longitudinal alignment of the tiered work racks facilitating the stacking of one rack on top of the other. This is accomplished by providing the inward edge of the hook portion 32 opposite to the engaging slot 34 with an angularly inclined cam surface 38 which is adapted to coact with a tab 40 rigidly affixed to the lower portion of the outer flange of the intermediate upright member 20 adjacent to the crane bar 26. The tab 40 during the lowering movement is adapted to contact the cam surface 38 of the hook portion of the crane bar disposed therebelow effecting longitudinal camming movement of the bar rack during its descent assuring appropriate longitudinal alignment thereof relative to the bar rack below.

An alternate satisfactory lift engaging structure in accordance with a second embodiment of the present invention as shown in FIGURES 8–10 can be satisfactorily employed for providing means for grasping and lifting the bar rack as well as lateral and longitudinal guidance thereby during the lowering of a second rack thereon. The bar rack construction as shown in FIGURES 8–10 is similar to that hereinbefore described in connection with FIGURES 1–7 and comprises lower and upper longitudinal members 14 and 16, respectively, which are interconnected by the upright end members 18, the upright intermediate members 20 and the transverse members 24. The combination guiding and engaging members comprise a body 42 including an inwardly directed flange or leg 44 which is adapted to be disposed in underlying relationship against the lower flange surface of the upper longitudinal members 16 as shown in FIGURE 9. The upper projecting end of the body 42 is provided with an outwardly diverging cam surface 46 which is adapted to coact with the lower longitudinal members 14 during the descending movement of a bar rack effecting lateral guiding and alignment thereof relative to the longitudinal axis of the bar rack below. The upper projecting portion of the body 42 is also provided with a longitudinally inclined cam surface 48 directed inwardly toward the center of the rack which is adapted to coact with the tabs 40 of a bar rack being lowered effecting appropriate longitudinal guidance and alignment thereof relative to the rack disposed therebelow.

The body 42 is also provided with a vertical lip generally indicated at 50 which is adapted to be disposed in overlying relationship against the edge of the outer flange of the upright intermediate member 20 as shown in FIGURES 8 and 10. The body 42 accordingly is securely fastened to the upper longitudinal member 16 and the intermediate upright member 20 along the edges of contact therewith whereby the lifting forces applied thereto are transmitted uniformly to the entire framework of the bar rack.

The body 42 is provided with a recess 52 as best seen in FIGURE 9 which opens toward the ends of the bar rack and having one wall thereof defined by the outer integral web of the upper longitudinal member 16. The recess 52 in each of the four body members 42 are adapted to be removably engaged by a suitably shaped tang (not shown) of a lifting mechanism for raising and transporting the bar rack and the bar stock contained therein to a selected location.

Figure 12:
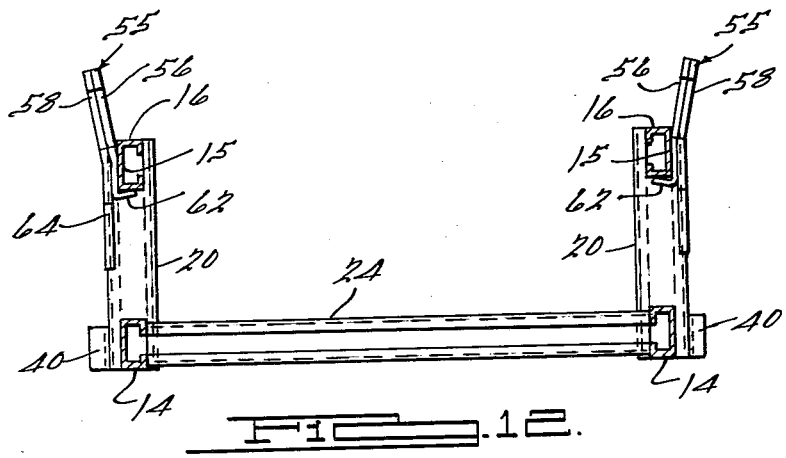
FIG. 12 is a transverse sectional view of the bar rack shown in FIG. 11, taken substantially along the line 12—12 thereof.

Another embodiment of the invention is illustrated in FIGURES 11 and 12 which is particularly adapted for use in light weight bar racks to provide means for grasping and lifting the racks as well as lateral and longitudinal guidance during the lowering of another rack thereon. The bar rack construction as shown in FIGURES 11 and 12 is similar to that hereinbefore described in connection with FIGS. 1 through 7 and also comprises lower and upper longitudinal members 14 and 16, respectively, which are interconnected by the upright end members 18, the intermediate upright members 20 and the transverse members 24 in the manner previously described. In this embodiment of the invention combination guiding and engaging members 55 are provided that are each formed of two plates 56 and 58 which are welded together to form a double thickness and which define an engaging slot 60 in which the latching rods 36 of the lifting tong 10 are adapted to become engaged for lifting and transporting the bar rack.

The intermediate portion of the plate 56 is welded to the web 15 of the upper longitudinal member 16 and the lower end portion of the plate 56 is bent inwardly to provide a flange 62 which is welded to the lower flange 13 of the upper longitudinal members 16. The edges of the plates 56 and 58 abut the web 15 of the adjacent upright member 20 and are welded thereto, the lower portion 64 of the plate 58 projecting substantially vertically downwardly to provide a gusset. Such a construction permits each member 55 to be directly welded to the adjacent upright member 20 as well as to the upper longitudinal member 16 which in turn is welded to the same upright member 20 in the manner previously described with the result that the weight supported by each member 55 is transmitted through the adjacent upright member 20 and at the same time both the longitudinal member 16 and the adjacent upright member 20 are substantially reinforced.

The upwardly projecting portions of the members 55 also serve a guiding function for facilitating the stacking of one bar rack on another bar rack. As shown in FIGURE 12, the upwardly projecting portions of the plates 56 and 58 are angularly inclined outwardly providing upwardly and outwardly diverging inner surfaces 66 which effect a camming action in coaction with the lower longitudinal members 14 of a second bar rack during the lowering thereof thereby facilitating lateral alignment of one rack with respect to the other. The upwardly projecting portions of the members 55 also serve to maintain the tiered bar racks in appropriate lateral alignment and prevent relative transverse movement thereof during storage in tiered relationship.

The upwardly projecting portions of the members 55 also serve to facilitate appropriate longitudinal alignment of the tiered racks facilitating the stacking of one rack on top of the other, this being accomplished by inclining the surfaces 68 of the plates 56 and 58 opposite the slot 60 as shown in FIGURE 11. With such a construction the surfaces 68 provide a camming action and coact with the tabs 40 in the manner previously described in connection with the embodiment of the invention illustrated in FIGURES 1 through 7 so that the tabs 40 during the lowering movement contact the surfaces 68 to effect longitudinal camming movement of the bar rack during its descent to assure appropriate longitudinal alignment thereof relative to the bar rack therebelow.

Another embodiment of the invention is illustrated in FIGURES 13 through 18 and is comprised of a bar rack generally designated 70 which defines an elongated framework that is open at the top and at the ends thereof to facilitate loading and unloading of stock therefrom as well as providing for a slight overhang of stock having a length greater than the rack. The bar rack 70 is comprised of a pair of upright side frames which are interconnected along the base thereof by a series of transverse members. Each side frame includes a lower longitudinal member 72 and an upper longitudinal member 74 which are disposed in vertically spaced, substantially parallel relationship and which extend for the entire length of the rack.

The longitudinal members 72 and 74 are of a partially closed channel shaped cross section, as shown in FIGURE 15, and each of the longitudinal members includes a first pair of flanges 76 and 78 which are disposed in spaced, substantially parallel relationship and which are joined on one side by an integral web 80 extending therebetween, and a second pair of flanges 82 and 84 are provided which extend toward each other from the flanges 76 and 78, respectively, in spaced parallel relationship to the web 80, the ends of flanges 82 and 84 terminating in spaced relationship so as to define an elongated slot 86 disposed centrally of the channel.

The longitudinal members 72, 74 are rigidly connected to each other by a plurality of upright members 88 which are spaced longitudinally of the longitudinal members and the opposite ends of which are fixed to the longitudinal members. The number of upright members employed can be varied in accordance with the desired length of the bar rack to achieve the desired strength and capacity. Each of the upright members 88 is of generally channel shaped cross section as shown in FIGURES 14 and 18 and includes a pair of flanges 90 and 92 which are integrally joined by a web 94. As shown in FIGURE 15, the lower and upper portions of the flanges 90 and 92 are cut away at a position spaced from the web 94 so as to define notches 96 and 98 adapted to receive the lower and upper longitudinal members 72 and 74, respectively. The height of the notches 96 and 98 is such that the upper ends of the upright members are substantially flush with the outer surface of the upper flange 76 on the member 74 and the lower ends of the upright members are substantially flush with the outer surface of the lower flange 78 on the member 72. The width of the notches 96 and 98 is equal to the transverse thickness of the longitudinal members 72 and 74 so that the outer surface of the web 80 of each of the longitudinal members is flush with the free ends of the flanges 90 and 92 of the upright members. With such a construction the flanges 82 and 84 of the longitudinal members are disposed outwardly of the rack with respect ot the web portions 94 of the upright members.

Each of the side frames comprising the longitudinal members 72 and 74 and the upright members 88 are rigidly secured to each other in spaced, substantially parallel relationship by a series of transverse members 100 which extend between the side frames. The spacing of the transverse members preferably corresponds to the spacing of the upright members and the transverse members are preferably of a partially closed channel shaped cross section as illustrated in FIGURE 17 so as to include a first pair of flanges 102 and 104 which are disposed in spaced, substantially parallel relationship and which are joined on one side by an integral web portion 106, a second pair of flanges 108 and 110 extending toward each other from the first pair of flanges 102 and 104 in spaced, parallel relationship to the web 106 with the ends of the flanges 108 and 110 terminating in spaced relationship so as to define an elongated slot 112 disposed centrally of the channel and having a width corresponding substantially to the width of the web portion 94 or minor outside dimension of the upright members 88.

The web portions 106 of the transverse members are provided with notches 114 which extend inwardly from each end of the web 106 and through which the upright members 88 extend as shown in FIGURE 18. The slots 114 are of a width corresponding substantially to the width of the web portions 94 or minor dimension of the upright members and the slots extend inwardly from the ends of the transverse members a distance corresponding substantially to the major dimension or depth of the flanges 90 and 92 of the upright members so that the ends of the transverse members terminate near the outer surfaces of the webs 80 of the longitudinal members. The number of transverse members employed can, of course, be varied in accordance with the desired length and strength of the rack, and the adjacent surfaces of the upright members 88, the longitudinal members 72 and 74 and the transverse members 100 are welded to each other so as to form a unitary structure. The spacing of the transverse members is such that the portions of the web 106 on the opposite sides of the upright members may be welded to the adjacent upright members and to the flange 76 of the longitudinal member 72 thereby effecting an interfitting relationship between the various structural components which forms a rigid and unitary framework.

It will be apparent from the foregoing that a relatively large edge-to-edge, surface-to-surface and edge-to-surface contact between the interfitting members is achieved in accordance with the configuration of the structural members and the arrangement thereof in the generally U-shaped framework thereby enabling adjoining members to be welded to obtain maximum strength at the connections and maximum rigidity in the resultant framework. It will also be apparent that the structural members 72, 74, 88 and 100 are positioned so as to achieve maximum resistance to bending and twisting of the framework as occasioned by heavy loads contained in the rack 70 and enable thinner gauge metals to be employed while achieving greater ultimate strength for the rack.

The above-described construction also permits the use of slings within the confines of the rack for the purpose of placing stock in or removing it from the rack. When bar stock, for example, is supported by the rack, the stock bears against the web portions 94 of the upright members and also bears against the webs 106 of the transverse members while the flanges 82 and 84 of the longitudinal members 72 and 74 are disposed outwardly of the web portions 94 of the upright members thereby providing clearance space which permits slings to be applied to and removed from the load when slings are disposed within the confines of the rack intermediate the transverse members 100.

In order to increase the strength of the rack, stress bars 116 may be provided which extend diagonally between the longitudinal members 72 and 74, the lower end portions of the stress bars 116 being welded to the flanges 82 and 84 of the lower longitudinal member 72 while the upper end portions of the stress bars 116 are welded to the flanges 82 and 84 of the upper longitudinal member 74.

In this embodiment of the invention crane bars 118 are provided which extend upwardly along the side frames of the rack. The lower longitudinal members 72 are provided with slots 120 in the web portion 80 thereof each adapted to receive a crane bar 118, and the lower end portion 122 of each crane bar projects through a slot 120 and is bent diagonally upwardly and welded to the lower longitudinal member at a position adjacent the junction of the flanges 76 and 82. The crane bars overlie the outer end portions of the intermediate upright members 88 and are welded to the ends of the flanges 90 and 92 of the upright members so as to form a box beam.

The upper portions of the crane bars are preferably provided with an extra thickness which is welded to the crane bar in the area formed as a hook portion generally indicated at 124 and is provided at the edges thereof facing the ends of the bar rack with an engaging slot 126 in which the latching rods 36 of the lifting tong 11 shown in FIGURE 1 are adapted to become engaged for lifting and transporting the bar rack.

The upper projecting portions of the crane bar 118 also serve a guiding function to facilitate the stacking of one bar rack on another, the upper projecting portions of the crane bars 118 being angularly inclined outwardly to form upwardly and outwardly diverging surfaces which provide a camming action in coaction with the lower longitudinal member 72 of a second bar rack during the lowering thereof so as to effect lateral alignment of one rack with respect to the other. The hook portions 124 also serve to maintain the tiered bar racks in appropriate lateral alignment and prevent relative edgewise slippage when the racks are stored in tiered relationship.

The upwardly projecting hook portions 124 also serve to facilitate appropriate longitudinal alignment of the racks relative to one another, this being accomplished by providing the inner edge of the hook portion 124 opposite the slot 126 with a cam surface 128 which is adapted to coact with an angle-shaped guide member 130 having an angularly inclined cam surface 132. The guide member 130 is fixed to the web 80 of the lower longitudinal member at a position adjacent the crane bar 118. The cam surface 132 of the guide member 130 is adapted to contact the cam surface 128 of the hook portion of the crane bar which is disposed therebelow during the lowering movement so as to effect longitudinal camming movement of the bar rack during its descent thereby assuring appropriate longitudinal alignment of the uppermost bar rack relative to the bar rack upon which it rests.

In accordance with the construction of the bar racks herein shown and described, a high strength, comparatively light weight, rigid framework is provided which is readily portable and can be conveniently stacked in a tiered relationship in a manner as shown in FIGURES 1 and 4. By virtue of the construction employed, the lower flange surfaces of the lower longitudinal members of an overlying bar rack are disposed in substantially longitudinal bearing contact against the upper flange surfaces of the upper longitudinal members of a bar rack disposed therebelow while the lower ends of the upright members of the overlying bar rack bear against the upper ends of the upright members of the underlying rack thereby providing a substantial uniform distribution of the weight of the work racks and bar stock thereabove through the longitudinal members as well as through the upright members. This elongated bearing contact surface of the longitudinal members simplifies the stacking of the bar racks in tiers and also reduces the likelihood of lateral or longitudinal slippage in the event the upright members are not precisely aligned. As shown in the drawings the bar rack structures have smooth internal surfaces against which the bar stock is disposed and all welds and edges are spaced from the carrying area thereby minimizing the possibility of inflicting damage to the surfaces of the stock.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a bar rack, the combination including a pair of side units each comprising a pair of horizontally extending longitudinal members disposed in vertically spaced parallel relationship and a plurality of vertically disposed upright members spaced longitudinally of said rack and extending between and being rigidly fixed to said longitudinal members, each of said members having a partially closed channel shaped cross section including a web, a first pair of spaced flanges projecting from said web and a second pair of flanges extending toward each other from said first flanges in parallel relationship to said web and terminating in spaced relationship so as to define a slot, the end portions of the web of each upright member having an inwardly extending recess intermediate said first flanges adapted to receive said longitudinal members, said longitudinal members extending through the slots and the recess in said upright members at the ends thereof, and a plurality of transverse members spaced longitudinally of said rack and extending between said side units, the end portions of said transverse members being fixed to said second flanges of the longitudinal members adjacent the lower edges of said side units to form a unitary structure open at the top and at each end.

2. In a bar rack, the combination including a pair of side units each comprising a pair of horizontally extending longitudinal members disposed in vertically spaced parallel relationship and a plurality of vertically disposed upright members spaced longitudinally of said rack and extending between and being rigidly fixed to said longitudinal members, each of said members having a partially closed channel shaped cross section including a web, a first pair of spaced flanges projecting from said web and a second pair of flanges extending toward each other from said first flanges in parallel relationship to said web and terminating in spaced relationship so as to define a slot, the end portions of the web of each upright member having an inwardly extending recess intermediate said first flanges adapted to receive said longitudinal members, said longitudinal members extending through the slots and the recesses in said upright members at the ends thereof with the outer flanges of said longitudinal members being flush with the adjacent ends of said upright members, and a plurality of transverse members spaced longitudinally of said rack and extending between said side units, the end portions of said transverse members being fixed to said second flanges of the longitudinal members adjacent the lower edges of said side units to form a unitary structure open at the top and at each end.

3. In a bar rack, the combination including a pair of spaced side units each comprising a pair of horizontally extending longitudinal members disposed in vertically spaced parallel relationship and extending for substantially the entire length of said rack and a plurality of vertically disposed upright members spaced longitudinally of said rack and extending between and being rigidly fixed to said longitudinal members, a plurality of transverse members spaced longitudinally of said rack and extending between and being fixed to said side units adjacent the lower edges thereof, each of said members having a partially closed channel shaped cross section including a web, a first pair of spaced flanges projecting from said web and a second pair of flanges extending toward each other from said first flanges in parallel relationship to said web and terminating in spaced relationship so as to define a slot, the end portions of the webs of said upright members each having an inwardly extending recess intermediate the first flanges thereof adapted to receive said longitudinal members, said longitudinal members extending through the slots and the recesses in said upright members at the ends thereof, the web portions of said upright members being disposed in parallel planes extending transversely of said rack and the web portions of said longitudinal members being disposed in parallel planes extending longitudinally of said rack, the end portions of said transverse members being fixed to said second flanges of said longitudinal members.

4. In a bar rack, the combination including a pair of spaced side units each comprising a pair of horizontally extending longitudinal members disposed in vertically spaced parallel relationship and extending for substantially the entire length of said rack and a plurality of vertically disposed upright members spaced longitudinally of said rack and extending between and being rigidly fixed to said longitudinal members, a plurality of transverse members spaced longitudinally of said rack and extending between and being fixed to said side units adjacent the lower edges thereof to form a unitary structure open at the top and at each end, each of said members having a partially closed channel shaped cross section including a web, a first pair of spaced flanges projecting from said web and a second pair of flanges extending toward each other from said first flanges in parallel relationship to said web and terminating in spaced relationship so as to define a slot, the end portions of the webs of said upright members each having an inwardly extending recess intermediate the first flanges thereof adapted to receive said longitudinal members, said longitudinal members extending through the slots and the recesses in said upright members at the ends thereof with the outer flanges of said longitudinal members being flush with the ends of said upright members, the web portions of said upright members being disposed at parallel planes extending transversely of said rack and the web portions of said longitudinal members being disposed in parallel planes extending longitudinally of said rack, the end portions of said transverse members being fixed to said second flanges of said longitudinal members and to an adjacent upright member.

5. A bar rack open at the top and at each end and comprised of a plurality of longitudinal members, a plurality of upright members and a plurality of transverse members, each of said members having a partially closed channel shaped cross section including a web, a first pair of spaced flanges projecting from said web and a second pair of flanges projecting toward each other from said first flanges in parallel relationship to said web and terminating in spaced relationship so as to define a slot, the end portions of the webs of each of said upright members having an inwardly extending recess intermediate said first flanges adapted to receive said longitudinal members, said longitudinal members extending through the slots and the recesses in said upright members, the web portions of said upright members being disposed in parallel planes extending transversely of said rack and the web portions of said longitudinal members being disposed in parallel planes extending longitudinally of said rack, said transverse members being spaced longitudinally of said rack and extending transversely of said rack adjacent the base thereof, the web portions of said transverse members extending in parallel planes parallel to the planes of the web portions of said upright members, the end portions of said transverse members being positioned in abutting relationship against the adjacent second flanges of the lower ones of longitudinal members and also being fixed to an adjacent upright member.

6. A bar rack open at the top and at each end and comprised of a plurality of longitudinal members, a plurality of upright members and a plurality of transverse members, each of said members having a partially closed channel shaped cross section including a web, a first pair of spaced flanges projecting from said web and a second pair of flanges projecting toward each other from said first flanges in parallel relationship to said web and terminating in spaced relationship so as to define a slot, the end portions of the webs of each of said upright members having an inwardly extending recess intermediate said first flanges adapted to receive said longitudinal members, said longitudinal members extending through the slots and the recesses in said upright members, the web portions of said upright members being disposed in parallel planes extending transversely of said rack and the web portions of said longitudinal members being disposed in parallel planes extending longitudinally of said rack, said transverse members being spaced longitudinally of said rack and extending transversely of said rack adjacent the base thereof, the web portions of said transverse members extending in parallel planes parallel to the planes of the web portions of said upright members, the end portions of said transverse members being positioned in abutting relationship against the adjacent second flanges of the lower ones of longitudinal members and also being fixed to an adjacent upright member, and means for lifting said rack, said means comprising a pair of generally U-shaped crane bars partially encompassing said rack at longitudinally spaced points therealong and rigidly fixed thereto, the upper portions of said bars projecting above the uppermost of said longitudinal members and being provided with hook means thereon, and longitudinally and transversely inclined cam means on said hook means adapted to coact with means on a second rack during descending movement thereof for longitudinally and transversely aligning the racks relative to each other.

7. A bar rack open at the top and at each end and comprised of a plurality of longitudinal members, a plurality of upright members and a plurality of transverse members, each of said members having a partially closed channel shaped cross section including a web, a first pair of spaced flanges projecting from said web and a second pair of flanges projecting toward each other from said first flanges in parallel relationship to said web and terminating in spaced relationship so as to define a slot, the end portions of each of the webs of said upright members having an inwardly extending recess intermediate said first flanges adapted to receive said longitudinal members, said longitudinal members extending through the slots and the recesses in said upright members, the web portions of said upright members being disposed in parallel planes extending transversely of said rack and the web portions of said longitudinal members being disposed in parallel planes extending longitudinally of said rack, said transverse members being spaced longitudinally of said rack and extending transversely of said rack adjacent the base thereof, the web portions of said transverse members extending in parallel planes parallel to the planes of the web portions of said upright members, the end portions of said transverse members being positioned in abutting relationship against the adjacent second flanges of the lower ones of longitudinal members and also being fixed to an adjacent upright member and engaging and guide means fixed to said rack, said last mentioned means comprising a pair of generally U-shaped crane bars partially encompassing said rack at longitudinally spaced points thereon and being rigidly fixed thereto, the lower of said longitudinal members each being provided with upwardly directed indentations therein for receiving said bar whereby the lowermost surface thereof is substantially flush with the lowermost surfaces of said lower longitudinal members, the upper portions of said bars projecting above the upper longitudinal members and defining hook means, said hook means being inclined outwardly relative to the web portions of said longitudinal members and being provided with longitudinally inwardly directed cam surfaces for coacting with means on a second rack during the descending movement thereof for longitudinally and transversely aligning said second rack relative to said first rack.

8. A bar rack open at the top and at each end and comprised of a plurality of longitudinal members, a plurality of upright members and a plurality of transverse members, each of said members having a partially closed channel shaped cross section including a web, a first pair of spaced flanges projecting from said web and a second pair of flanges projecting toward each other from said first flanges in parallel relationship to said web and terminating in spaced relationship so as to define a slot, the end portions of each of the webs of said upright members having an inwardly extending recess intermediate said first flanges adapted to receive said longitudinal members, said longitudinal members extending through the slots and the recesses in said upright members, the web portions of said upright members being disposed in parallel planes extending transversely of said rack and the web portions of said longitudinal members being disposed in parallel planes extending longitudinally of said rack, said transverse members being spaced longitudinally of said rack and extending transversely of said rack adjacent the base thereof, the web portions of said transverse members extending in parallel planes parallel to the planes of the web portions of said upright members, the end portions of said transverse members being positioned in abutting relationship against the adjacent second flanges of the lower ones of longitudinal members and also being fixed to an adjacent upright member, and a plurality of combination guide and engaging elements disposed in longitudinally and transversely spaced relationship on said rack and being rigidly fixed to the upper said longitudinal members and an upright member connected thereto, each of said combination guide and engaging elements comprising a body member defining a longitudinal outwardly directed cavity for removably receiving an engaging tong, the upper portion of said body member projecting above the upper longitudinal members and being provided with a lateral outwardly diverging cam surface and a longitudinal inwardly inclined cam surface adapted to coact with means on a second rack during descending movement thereof for longitudinally and transversely aligning the racks relative to each other.

9. A bar rack open at the top and at each end and comprised of a plurality of longitudinal members, a plurality of upright members and a plurality of transverse members, each of said members having a partially closed channel shaped cross section including a web, a first pair of spaced flanges projecting from said web and a second pair of flanges projecting toward each other from said first flanges in parallel relationship to said web and terminating in spaced relationship so as to define a slot, the end portions of each of the webs of said upright members having an inwardly extending recess intermediate said first flanges adapted to receive said longitudinal members, said longitudinal members extending through the slots and the recesses in said upright members, the web portions of said upright members being disposed in parallel planes extending transversely of said rack and the web portions of said longitudinal members being disposed in parallel planes extending longitudinally of said rack, said transverse members being spaced longitudinally of said rack and extending transversely of said rack adjacent the base thereof, the web portions of said transverse members extending in parallel planes parallel to the planes of the web portions of said upright members, the end portions of said transverse members being positioned in abutting relationship against the adjacent second flanges of the lower ones of longitudinal members and also being fixed to an adjacent upright member, and means for lifting said rack, said means comprising a plurality of bars fixed to the opposite sides of said rack at longitudinally spaced points therealong, the upper portions of said bars projecting above the uppermost of said longitudinal members and being provided with hook means thereon, and longitudinally and transversely inclined cam means on said upper portions of said bars adapted to coact with means on a second rack during descending movement thereof for longitudinally and transversely aligning the racks relative to each other.

10. A bar rack open at the top and at each end and comprised of a plurality of longitudinal members, a plurality of upright members and a plurality of transverse members, each of said members having a partially closed channel shaped cross section including a web, a first pair of spaced flanges projecting from said web and a second pair of flanges projecting toward each other from said first flanges in parallel relationship to said web and terminating in spaced relationship so as to define a slot, the end portions of each of the webs of said upright members having an inwardly extending recess intermediate said first flanges adapted to receive said longitudinal members, said longitudinal members extending through the slots and the recesses in said upright members, the web portions of said upright members being disposed in parallel planes extending transversely of said rack and the web portions of said longitudinal members being disposed in parallel planes extending longitudinally of said rack, said transverse members being spaced longitudinally of said rack and extending transversely of said rack adjacent the base thereof, the web portions of said transverse members extending in parallel planes parallel to the planes of the web portions of said upright members, the end portions of said transverse members being positioned in abutting relationship against the adjacent second flanges of the lower ones of longitudinal members and also being fixed to an adjacent upright member, and a plurality of combination guide and engaging elements disposed in longitudinally and transversely spaced relationship on said rack and being rigidly fixed to the upper said longitudinal members and an upright member connected thereto, each of said combination guide and engaging means comprising a pair of plates welded together and defining an engaging slot for removably receiving an engaging tong, the upper portions of said plates projecting above the upper longitudinal members and being provided with a lateral outwardly diverging cam surface and a longitudinal inwardly inclined cam surface adapted to coact with means on a second rack during descending movement thereof for longitudinally and transversely aligning the racks relative to each other.

11. In a bar rack, the combination including a pair of side units each comprising a pair of horizontally extending longitudinal members disposed in vertically spaced parallel relationship and a plurality of vertically spaced upright members spaced longitudinally of said rack and extending between and being rigidly fixed to said longitudinal members, each of said longitudinal members having a partially closed channel shaped cross section including a web, a first pair of spaced flanges projecting from said web and a second pair of flanges extending toward each other from said first flanges in parallel relationship to said web, said upright members being of channel shaped cross section including a pair of flanges integrally joined by a web, the end portions of said upright members having an inwardly extending recess adapted to receive said longitudinal members, said longitudinal members extending through the recesses defined by said upright members at the opposite ends thereof with the outer flanges of said longitudinal members being substantially flush with the adjacent ends of said upright members, and a plurality of transverse members spaced longitudinally of said rack and extending between said side units, the end portions of said transverse members being fixed to the lowermost longitudinal members to form a unitary structure open at the top and at each end.

12. In a bar rack, the combination including a pair of side units each comprising a pair of horizontally extending longitudinal members disposed in vertically spaced parallel relationship and a plurality of vertically spaced upright members spaced longitudinally of said rack and extending between and being rigidly fixed to said longitudinal members, each of said longitudinal members having a partially closed channel shaped cross section including a web, a first pair of spaced flanges projecting from said web and a second pair of flanges extending toward each other from said first flanges in parallel relationship to said web, said upright members being of channel shaped cross section including a pair of flanges integrally joined by a web, the end portions of said upright members having an inwardly extending recess adapted to receive said longitudinal members, said longitudinal members extending through the recesses defined by said upright members at the opposite ends thereof with the outer flanges of said longitudinal members being substantially flush with the adjacent ends of said upright members, a plurality of transverse members spaced longitudinally of said rack and extending between said side units, the end portions of said transverse members being fixed to the lowermost longitudinal members to form a unitary structure open at the top and at each end, and means on said side units engageable with means for lifting said rack.

13. In a bar rack, the combination including a pair of side units each comprising a pair of horizontally extending longitudinal members disposed in vertically spaced parallel relationship and a plurality of vertically spaced upright members spaced longitudinally of said rack and extending between and being rigidly fixed to said longitudinal members, each of said longitudinal members having a partially closed channel shaped cross section including a web, a first pair of spaced flanges projecting from said web and a second pair of flanges extending toward each other from said first flanges in parallel relationship to said web, said upright members being of channel shaped cross section including a pair of flanges integrally joined by a web, the end portions of said upright members having an inwardly extending recess adapted to receive said longitudinal members, said longitudinal members extending through the recesses defined by said upright members at the opposite ends thereof with the outer flanges of said longitudinal members being substantially flush with the adjacent ends of said upright members, a plurality of transverse members spaced longitudinally of said rack and extending between said side units, the end portions of said transverse members being fixed to the lowermost longitudinal members to form a unitary structure open at the top and at each end, and means on said side units for lifting said rack, said last-mentioned means comprising a plurality of crane bars fixed to said side units in longitudinally spaced relationship, the upper portions of said bars projecting above said side units and being provided with hook means thereon for removably engaging lifting means, and cam means on said side units adapted to coact with means on a second rack during descending movement thereof for longitudinally and transversely aligning the racks relative to each other.

14. In a bar rack, the combination including a pair of side units each comprising a pair of horizontally extending longitudinal members disposed in vertically spaced parallel relationship and a plurality of vertically spaced upright members spaced longitudinally of said rack and extending between and being rigidly fixed to said longitudinal members, each of said longitudinal members having a partially closed channel shaped cross section including a web, a first pair of spaced flanges projecting from said web and a second pair of flanges extending toward each other from said first flanges in parallel relationship to said web, said upright members being of channel shaped cross section including a pair of flanges integrally joined by a web, the end portions of said upright members having an inwardly extending recess adapted to receive said longitudinal members, said longitudinal members extending through the recesses defined by said upright members at the opposite ends thereof with the outer flanges of said longitudinal members being substantially flush with the adjacent ends of said upright members, a plurality of transverse members spaced longitudinally of said rack and extending between said side units, the end portions of said transverse members being fixed to the lowermost longitudinal members to form a unitary structure open at the top and at each end, and means on said side units for lifting said rack, said last-mentioned means comprising a pair of crane bars fixed to each of said side units in longitudinally spaced relationship, the lower of said longitudinal members each being provided with slots in the web thereof adapted to receive the lower end portions of said crane bars, the upper portions of said bars projecting above the upper longitudinal members and defining hook means, said hook means being inclined outwardly relative to the web portions of said longitudinal members and being provided with cam surfaces adapted to coact with means on a second rack during the descending movement thereof for longitudinally and transversely aligning said second rack relative to said first rack.

References Cited by the Examiner

UNITED STATES PATENTS

| 732,037 | 6/03 | Best | 211—60 |
| 1,985,150 | 12/34 | Collins | 189—34 |
| 2,960,238 | 11/60 | Park | 211—134 |
| 3,028,186 | 4/62 | Skubic | 294—67 |

FOREIGN PATENTS

| 1,001,473 | 1/57 | Germany. |

SAMUEL F. COLEMAN, *Acting Primary Examiner*.
FRANK L. ABBOTT, ERNEST A. FALLER, JR.,
*Examiners*.